No. 825,571. PATENTED JULY 10, 1906.
W. P. ALLEN.
DEVICE FOR UNLOADING AND DISTRIBUTING HAY OR STRAW IN MOWS.
APPLICATION FILED OCT. 14, 1905.
2 SHEETS—SHEET 1.
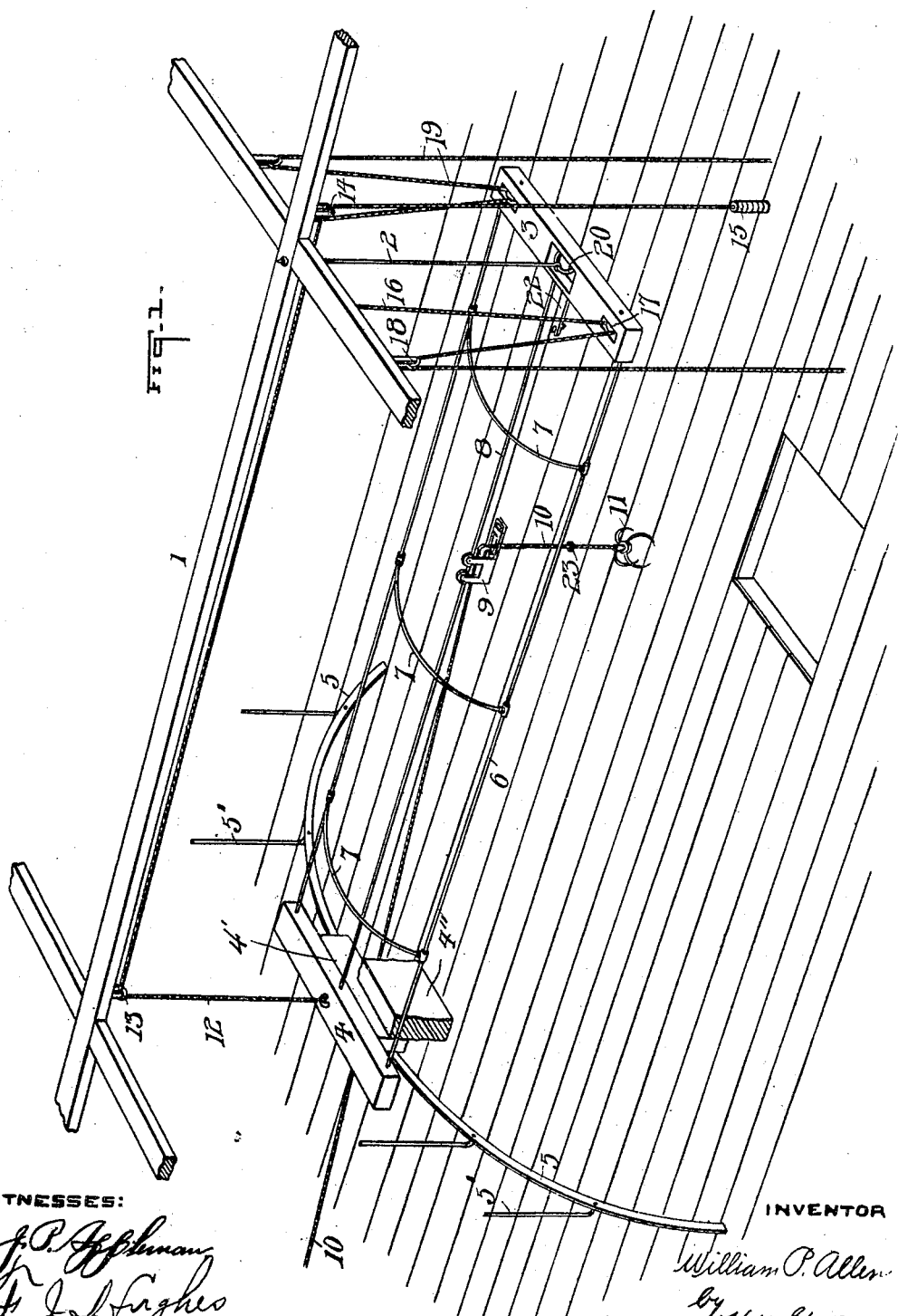
WITNESSES:
INVENTOR
William P. Allen
by H. W. Stevenson
ATTORNEY No. 825,571. PATENTED JULY 10, 1906.
W. P. ALLEN.
DEVICE FOR UNLOADING AND DISTRIBUTING HAY OR STRAW IN MOWS.
APPLICATION FILED OCT. 14, 1905.
2 SHEETS—SHEET 2.
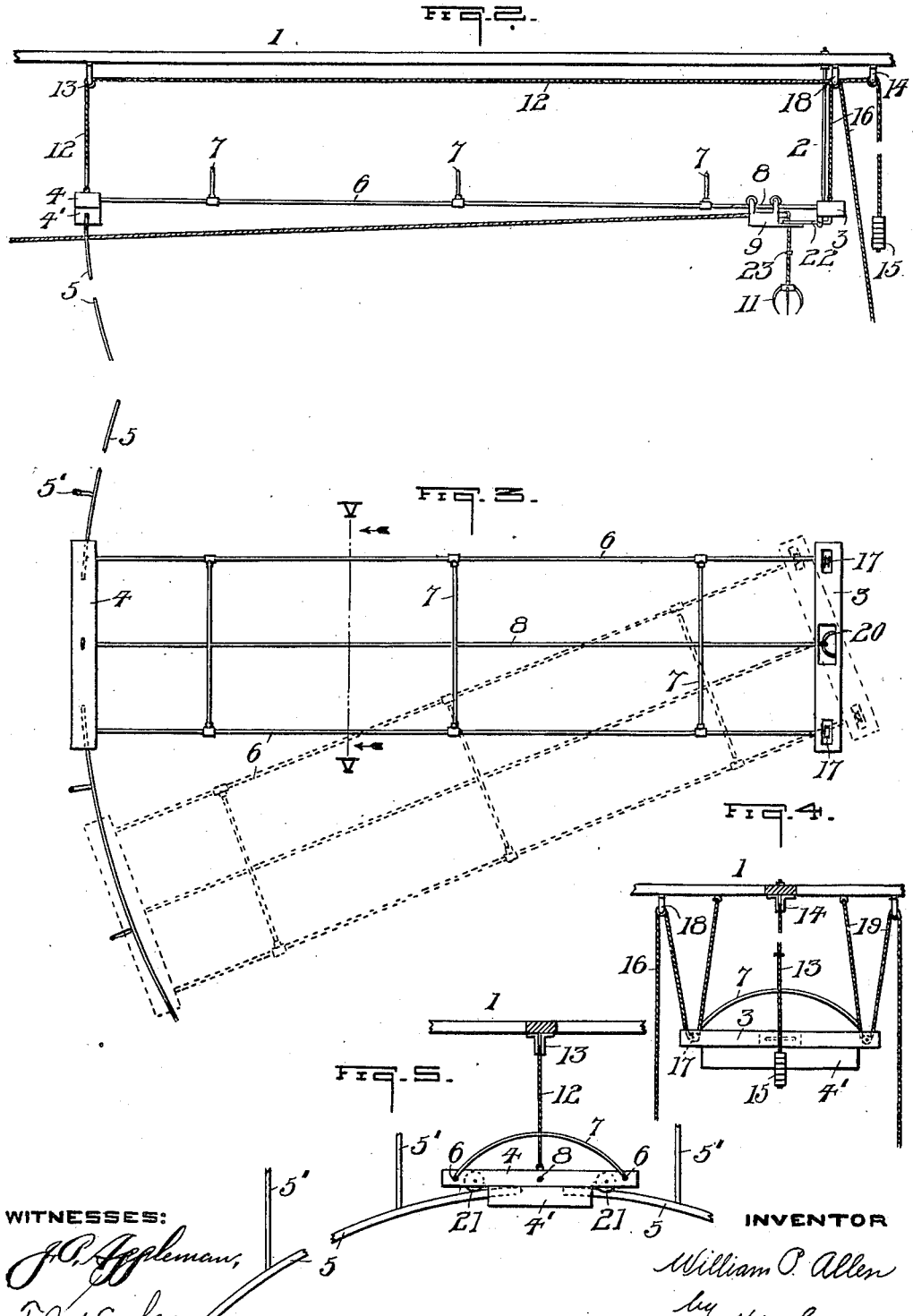
WITNESSES:
INVENTOR
William P. Allen
by H. W. Stevenson
ATTORNEY

UNITED STATES PATENT OFFICE.

WILLIAM P. ALLEN, OF WOODLAWN, PENNSYLVANIA.

DEVICE FOR UNLOADING AND DISTRIBUTING HAY OR STRAW IN MOWS.

No. 825,571.

Specification of Letters Patent.

Patented July 10, 1906.

Application filed October 14, 1905. Serial No. 282,716.

*To all whom it may concern:*

Be it known that I, WILLIAM P. ALLEN, a citizen of the United States, residing at Woodlawn, in the county of Beaver and State of Pennsylvania, have invented certain new and useful Improvements in a Device for Unloading and Distributing Hay or Straw in a Mow; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a new, novel, and useful improvement in a device for unloading hay or straw from a wagon and distributing the same in the mow of a barn.

It is the primary object of my invention to provide a simple, speedy, and inexpensive means for equalizing the distribution of the hay, straw, or other similar farm products in the mow.

In the accompanying drawings, in two sheets, forming a part of this specification, I have shown several views of my device, Figure 1, Sheet 1, being a perspective view showing the manner of securing my device to the rafters of the barn. Fig. 2, Sheet 2, is a side elevation; Fig. 3, a top plan view showing by dotted lines position of frame when tilted. Fig. 4 is a view of the tilting end of the device; and Fig. 5 a cross-sectional view of the opposite end, taken on line V V of Fig. 3.

Throughout the drawings the numeral 1 represents the supporting-framework, which is secured in any suitable manner to the rafters of the barn. Suspended from one end of the framework by a rod 2 is a tilting block 3, which forms one end of the operating part of my device. A traveling block 4, normally seated on a stationary rest 4', which is secured to a cross-beam 4", (shown fragmentarily in Fig. 1,) extending from side to side of the barn, constitutes the opposite end of the operating part of my device. Extending outwardly from both ends of the block 4' is a guide rail or track 5, both sides curving downwardly, being supported by suitable hangers 5'.

The two blocks 3 and 4 are connected by iron rods 6 6 and these latter in turn by brace-rods 7 7. A guide rail or track 8 also connects the two end blocks. On this rail is mounted a carrier or buggy 9, and suspended therethrough is a rope 10, carrying the hay-fork 11. This operating-rope 10 extends out through the barn to some convenient point. Secured to the traveling block 4 is a rope 12, which passes up through a sheave 13, secured to the framework 1, then along the under side of said framework, through another sheave 14, and has attached to the free end thereof a balance-weight 15.

Secured to one side of the framework 1, at the tilting end thereof, is a rope 16, which passes down through a pulley 17 in one end of the block 3, thence upward and through a sheave 18, secured to the under side of the framework. A similar rope 19 it arranged in a like manner at the opposite side of the framework. The lower end of the rod 2 is operatively secured to a ring or any suitable pivotal joint 20, located in the center of the tilting block 3. The guide rails or track 5 are firmly secured to the ends of the supporting-block 4', both curving downwardly and on a radius with the pivotal point of the supporting-rod 2 as a center. Arranged on the under side of the traveling block 4, at both ends thereof, are the wheels 21 21, adapted to engage with the rail 5 when the framework is tilted to either side. On the under side of the tilting block 3 I have arranged a pivotal catch 22 or any other suitable means for holding the carrier 9 in position while the fork 11 is being embedded in the hay or straw and also during the drawing-up process. A tripping arrangement 23 on the rope 10 will raise the hook 22, release the carrier 9, and permit it to be drawn along the track 8.

In the operation of my device the carrier 9 is drawn to its normal position at the tilting end of the frame, being directly over the load of hay or straw, and is held in this position by means of the hook 22 or any other suitable means. The fork 11 is next lowered onto the wagon, and after embedding it firmly in the hay or straw the same is drawn upward by means of the pulling-rope 10. At any convenient point on this rope near the fork is a suitable tripping arrangement 23, that will disengage the hook 22 from contact with the carrier 9 and permit the latter to be drawn along the track 8 to any desired point. If it is desired to drop the bunch of hay or straw on the right-hand side of the mow, by pulling on the rope 16 it will draw one end of the block 3 upward and tilt the entire operating part of the framework to the right. This movement will throw one end of the block 4 into contact with the rail 5, and aided by the weight of the hay adhering to the fork this block will travel down the track until arrested by the weight 15 coming in contact with the sheave 14. By pulling on the rope 19 the frame may be tilted to the left and the block 4 made to travel down the left-hand side of the track 5, where the frame will assume the position shown by dotted lines in Fig. 3 of the drawings. Upon pulling the usual tripping-cord attached to the fork 11 the hay will be released and fall into the mow. This weight being removed from that end of the frame, the block 4 will travel back up the track 5 and assume its normal position on the rest 4', being drawn thence by the balance-weight 15, attached to the rope 12. The carrier 9 is then drawn back to its normal position near the block 3 and held thus while the fork is being lowered and raised with additional bunches of hay or straw. This process is repeated, as heretofore described, until the entire load has been removed from the wagon and distributed in the mow.

Having thus fully shown and described my invention, what I claim, and desire to secure by Letters Patent, is—

1. In a device of the character described, the operating-framework suspended at one end from the rafters of the barn, by a supporting-rod, the lower end of the supporting-rod being pivotally connected with the end block of said frame; a guide rail or track suspended from the rafters of the barn, the ends thereof curving downwardly and on a radius with the pivotal point of said supporting-rod as a center; a block, forming the opposite end of said framework, adapted to travel down either side of said guide-rail; means for drawing said traveling block back to its normal seat; a guide-rail extending longitudinally from end to end of the framework; and a suitable carrier or buggy adapted to move back and forth along said guide-rail; as, and for, the purpose set forth.

2. In a device of the character described, the operating-framework suspended at one end of the framework from the rafters of the barn, by a supporting-rod, the lower end of the supporting-rod being pivotally connected in the center of the end block of said frame; a guide rail or track suspended from the rafters of the barn, the ends thereof curving downwardly and on a radius with the pivotal point of said supporting-rod as a center; a block, forming the opposite end of said framework, adapted to travel down either side of said guide-rail; means, connected with one end, for tilting said framework to either side; means for drawing said traveling block back to its normal seat; a guide-rail extending longitudinally from end to end of the framework; and a suitable carrier adapted to move back and forth along said guide-rail; as, and for, the purpose set forth.

3. In a device of the character described, the operating-framework suspended at one end from the rafters of the barn, by a supporting-rod, the lower end of the supporting-rod being pivotally connected in the center of the end block of said frame; a guide rail or track suspended from the rafters of the barn, the ends thereof curving downwardly and on a radius with the pivotal point of said supporting-rod as a center; a suitable rest in the center of said guide-rail; a block, forming the opposite end of said framework, and normally seated on said rest, adapted to travel down either side of said guide-rail; means, connected with one end of the framework, for tilting said framework to either side; weighted means, connected with said traveling block, for drawing the latter back to its normal seat; a guide-rail extending longitudinally from end to end of the framework; a carrier or buggy seated on said guide-rail; means, passing through said carrier, for lifting the hay or straw from the wagon and pulling said carrier along the guide-rail; automatic means for catching and holding said carrier at the end of the framework during the drawing-up process; and means for releasing said carrier from this position; as, and for, the purpose set forth.

4. In a device of the character described, the operating-framework suspended at one end from the rafters of the barn, by a supporting-rod, the lower end of the supporting-rod being pivotally connected in the center of the end block of said frame; a guide rail or track suspended from the rafters of the barn, the ends thereof curving downwardly and on a radius with the pivotal point of said supporting-rod as a center; a suitable rest in the center of said guide-rail; a block, forming the opposite end of said framework, and normally seated on said rest, adapted to travel down either side of said guide-rail; means, connected with one end, of the framework for tilting said framework to either side; weighted means, connected with said traveling block, for drawing the latter back to its normal seat; a guide-rail extending longitudinally from end to end of the framework; a carrier, or buggy, adapted to move back and forth along said guide-rail; an operating-rope passing through said carrier, one end extending through the barn to some convenient point, and on the opposite end being arranged a hay-fork; automatic means for catching and holding said carrier at the end of the framework during the drawing-up process; and means, located on the operating-rope near the hay-fork, for releasing said carrier from this position; as, and for, the purpose set forth.

In testimony whereof I affix my signature in presence of two witnesses.

WILLIAM P. ALLEN.

Witnesses:
  JAMES N. MAXWELL,
  BEATRICE FITZGERALD.